United States Patent [19]

Hellmer

[11] 4,355,967
[45] Oct. 26, 1982

[54] LABEL APPLYING DEVICE
[75] Inventor: Ernest W. Hellmer, Chicago, Ill.
[73] Assignee: The Continental Group, Inc., Stamford, Conn.
[21] Appl. No.: 192,393
[22] Filed: Sep. 30, 1980
[51] Int. Cl.[3] .................... B29C 17/07; B65H 3/08; B65H 3/46
[52] U.S. Cl. ............................ 425/503; 264/509; 271/103; 271/106; 271/107; 425/504; 425/522; 425/539
[58] Field of Search .............. 425/503, 522, 539, 504; 264/509; 271/103, 106, 107

[56] References Cited
U.S. PATENT DOCUMENTS

| 2,745,665 | 5/1956 | Labombarpe | 271/103 |
|---|---|---|---|
| 3,053,529 | 9/1962 | Dunn | 271/11 |
| 3,176,978 | 4/1965 | Baker et al. | 271/5 |
| 3,287,011 | 11/1966 | Currie, Jr. | 271/12 |
| 3,292,209 | 12/1966 | Borkmann | 271/14 X |
| 3,324,508 | 6/1967 | Dickinson | 264/265 X |
| 3,797,822 | 3/1974 | Anderson | 271/12 |

Primary Examiner—Jan H. Silbaugh
Attorney, Agent, or Firm—Charles E. Brown

[57] ABSTRACT

This relates to a transfer device for transferring labels from a stack into mold cavities without modifying the operation of the existing molding machine. The transfer device includes a pivotally mounted arm which is positioned and pivoted by a linear drive shaft positioned by a cam carried by an associated mold half. The transfer head is mounted on the arm for pivoting about the arm by way of an actuator which includes drive pulleys coupled by drive belts. The transfer head includes vacuum heads, one of which has associated with a suction cup thereof bellows for retracting the suction cup after the suction cup has sealed with the label to initiate peeling of the label from the stack. The suction cup is guidingly mounted so as to maintain its orientation at all times.

13 Claims, 7 Drawing Figures

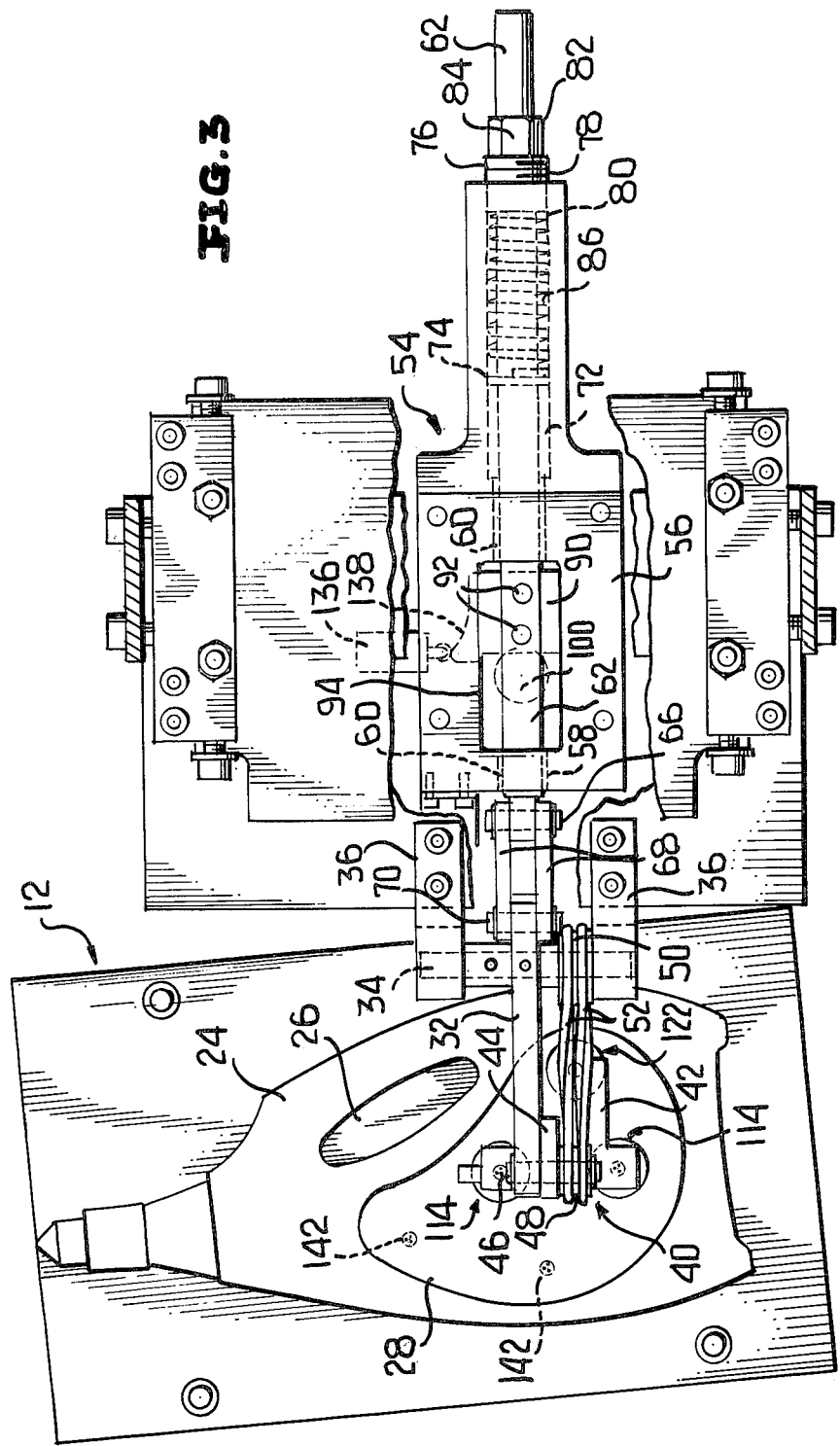

LABEL APPLYING DEVICE

This invention relates to a label applying device for applying labels in the cavities of blow mold halves of a blow molding machine during the normal operation of the machine.

This invention is an improvement on my transfer device for which an application for patent has been filed on even data herewith.

In my prior device, a transfer head is pivotally mounted on a transfer arm for pivoting relative to the transfer arm in response to pivoting of the transfer arm by drive means driven by an associated moving blow mold half. The actuating means for effecting relative pivoting of the transfer head with respect to the arm included cam means which required a greater force than desired to effect the pivoting of the transfer head relative to the arm. This invention relates to an improved actuating means for effecting the timed pivoting of the transfer head relative to the arm.

This invention also relates to an improved drive means for effecting the pivoting of the arm in response to movement of an associated blow mold half past the transfer device.

Finally, this invention relates to an improvement on the movable vacuum head of the transfer head so as to effect stabilization of the movable vacuum head in the several positions thereof.

With the above and other objects in view that will hereinafter appear, the nature of the invention will be more clearly understood by reference to the following detailed description, the appended claims, and the several views illustrated in the accompanying drawings.

IN THE DRAWINGS

FIG. 3 is an enlarged fragmentary horizontal sectional view taken generally along the line 3—3 of FIG. 2, and shows further the details of the transfer device, parts being broken away and shown in section.

Figure 1:
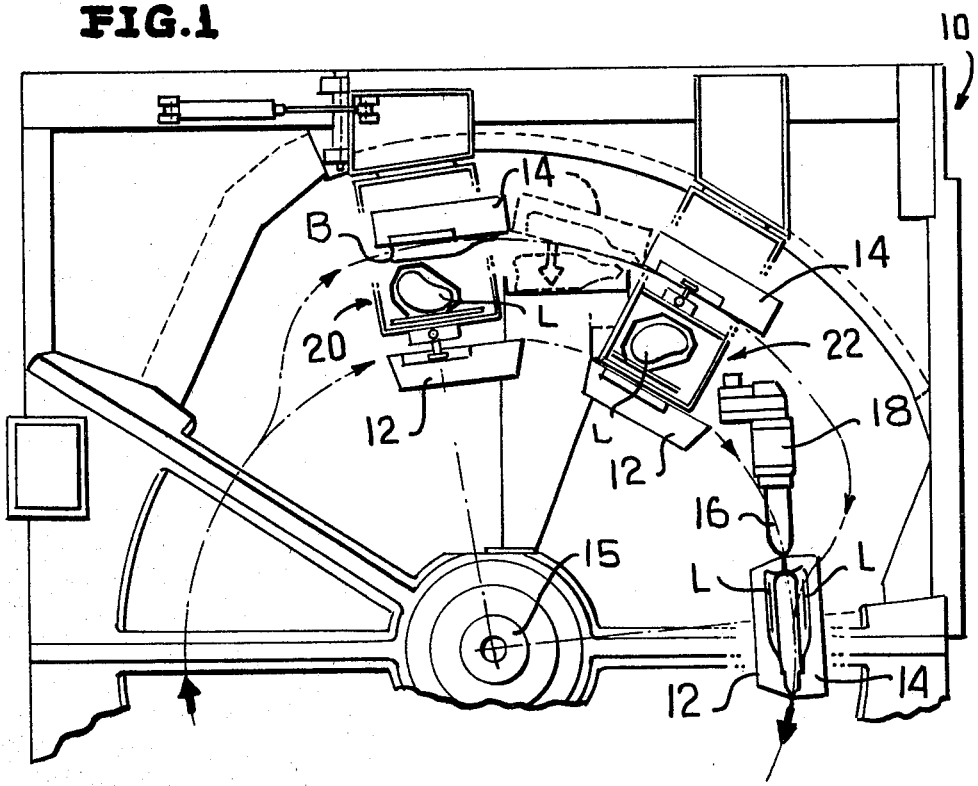
FIG. 1 is a fragmentary schematic side elevational view of a blow molding machine having incorporated therein label applying mechanisms for separately applying labels to each of the blow mold cavities.

Referring now to the drawings in detail, reference is first made to FIG. 1 wherein there is schematically illustrated a conventional blow molding machine of the well known wheel type. The blow molding machine, which is generally identified by the numeral 10, includes an inner set of mold halves 12 and an outer set of mold halves 14 suitably mounted for rotation in unison about a main shaft 15 of the wheel. In the conventional operation of the machine 10, as a set of mold halves 12, 14 approaches a vertical position, there is disposed between the mold halves an extruded plastics material tube 16 which is continuously extruded by a conventional extruder head 18. The set of mold halves 12, 14 clamp about the extruded tube and seal opposite ends of the tube.

In a conventional manner, gas, generally air, under pressure is directed into the sealed-off length of tube within the closed mold defined by the set of mold halves 12, 14 and the tube is blown to the configuration defined by the mold. This occurs while the machine is constantly rotating in a clockwise manner in the illustrated embodiment. After the molded article has had time to set, the mold halves begin to separate somewhere in the vicinity of the 9:00 o'clock position. The construction of the mold halves is such that the blown article, such as a bottle B, adheres to the outer mold half 14 as it moves radially outwardly away from the respective inner mold half 12. Generally, the blow molded article is discharged from the outer mold half 14 in the vicinity of the 12:00 o'clock position of the mold.

In accordance with this invention, prior to the mold halves closing about the extruded tube 16, suitable labels are placed in one or both mold halves. In the illustrated embodiment of the invention, a first label is placed in each inner mold half 12 by a label applicator generally identified by the numeral 20 at a time while the molded article or bottle B is still within the outer mold half 14. Thereafter, the bottle is discharged, followed by a second label applicator 22 functioning to place a suitable label in the outer mold half 14.

This invention relates to the label applicator, and most specifically to the transfer apparatus for transferring a label from a stack of labels into a respective blow mold cavity. Inasmuch as the label applicators 20, 22 are identical except for being inverted, only the details of the label applicator 20 will be set forth herein.

Reference is now made to FIG. 3 wherein a typical inner mold half 12 is illustrated. It will be seen that the mold half 12 has a cavity 24 particularly configurated to define a bottle B including a handle which, while it is an integral continuation of the remainder of the bottle, is separated from an adjacent portion of the bottle by an opening. This opening is defined by an upstanding boss 26 in the cavity 24. The configuration of the bottle B is such that adjacent the boss 26 there is a generally flat wall portion 28 of the cavity to which a label L is to be applied with the outline of the label corresponding generally to the configuration of the wall portion 28.

Figure 2:
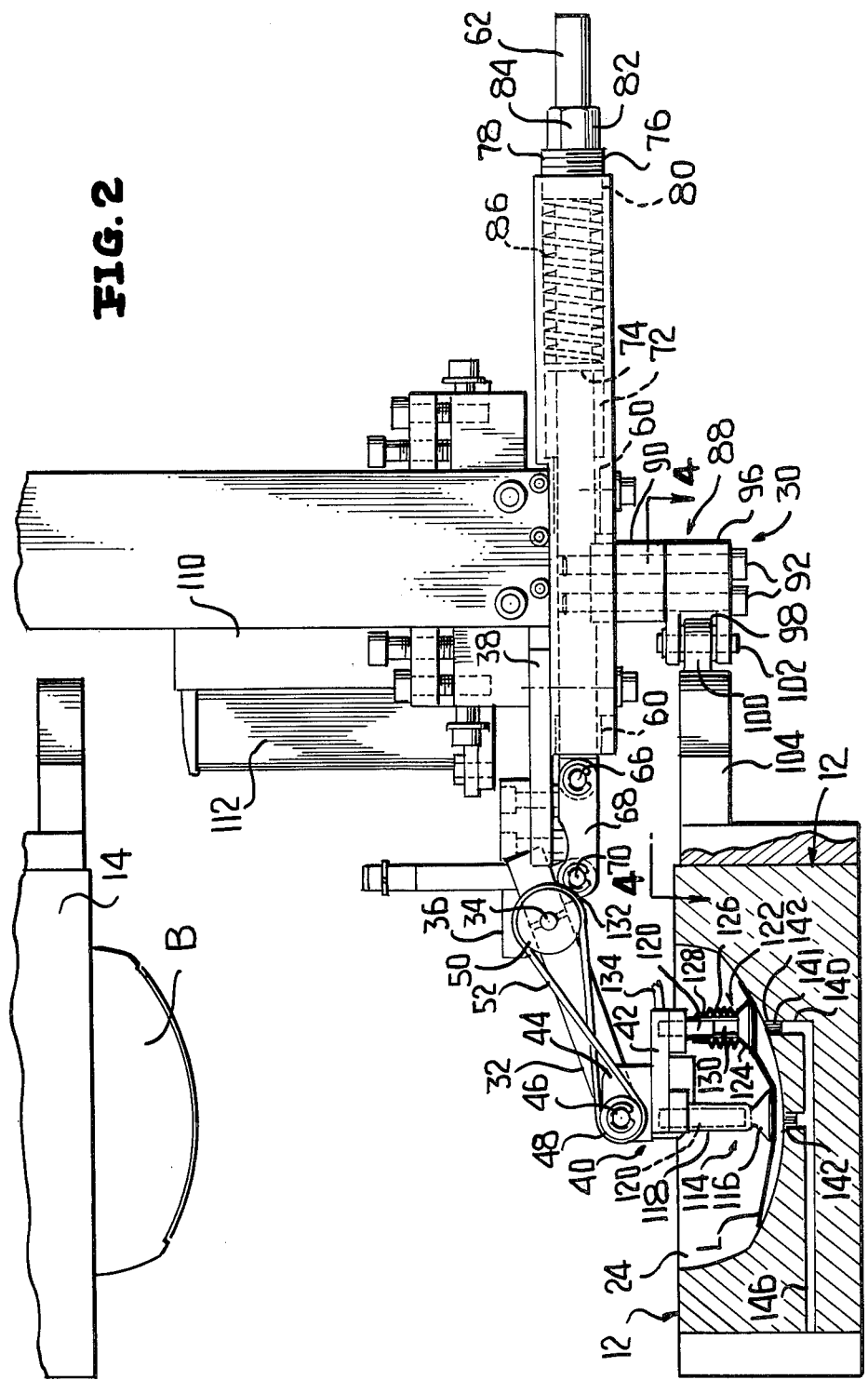
FIG. 2 is an enlarged elevational view showing the details of the transfer device and its relationship with respect to a label stack and an associated blow mold half.

The transfer device, which is generally identified by the numeral 30, is best illustrated in FIGS. 2 and 3.

The transfer device 30 includes an arm 32 which is carried by a pivot shaft 34, the ends of the pivot shaft 34 being mounted in support blocks 36 which project from a mounting plate 38. The arm 32 has mounted at the outer end thereof a transfer head 40 for pivoting about the outer end of the arm 32. The transfer head 40 includes a plate 42 carrying an upstanding block 44 which is pivotally mounted on a support pin 46 carried by the outer end of the arm 32.

In order that the transfer head 40 may rotate about the end of the arm 32 in response to pivoting of the arm 32 about the axis of the pivot pin 34, the block 44 has fixedly secured thereto and integrally formed therewith a pulley 48. The pulley 48 is aligned with a pulley 50 which is mounted on the pivot shaft 34 and is fixed against rotation with the arm 32 and the pivot shaft 34.

In the preferred embodiment of the invention, each of the pulleys 48 and 50 is of the double groove type, and two drive belts 52 connect the pulleys 48, 50 in driving relation. As is belt shown in FIG. 2, each belt 52 is arranged in a generally FIG. 8 configuration so that the direction of rotation of the pulley 48 is opposite that of the pulley 50.

It will be readily apparent that when the arm 32 is moved toward a vertical position in a clockwise direction, the pulleys 48 and 50, through the drive belts 52, will effect rotation of the transfer head 40 in a clockwise direction about the end of the arm 32.

As will be described in more detail hereinafter, the arm 32 will move through an arcuate extent on the order of 110° while the transfer head 40 will move through an arcuate extent on the order of 270° with the transfer head 40 moving through an arcuate extent about the arm 32 on the order of 160°.

It is also to be understood that the drive connection between the arm 32 and the transfer head 40, including the pulleys 48 and 50 and the drive belts 52, will be considered actuator means.

In order to effect the swinging of the arm 32 about the axis of the pivot pin 34, there are provided drive means generally identified by the numeral 54. The drive means 54 include a plate 56, the outline of which is best shown in FIG. 3. The plate 56 is secured to the underside of the plate 38 and has a longitudinal bore 58 therethrough. It is preferred that the bore 58 be defined by suitable bushings 60.

The drive shaft 62 extends through the bushings 60 and at the left end of the plate 56 the shaft 62 is flattened as at 64 and carries a pivot pin 66 on which there is pivotally mounted a pair of parallel links 68. The opposite end portions of the links 68 are connected to the arm 32 by a pivot pin 70.

The plate 56 is provided in the right portion thereof with an enlarged bore 72 and within that bore the drive shaft 62 is provided with a collar 74. The bore 72 extends through the right end of the plate 56 and is closed by a combination stop and guide member 76 which is provided with external threads 78 threadably engaged in an internally threaded extension 80 of the bore 72. The member 76 is provided with an extension 82 having flats 84 thereon for receiving a wrench. The member 76 is adjustable for a reason to be described hereinafter.

The shaft 62 carries between the collar 74 and the member 76 a compression spring 86. The compression spring 86 serves normally to urge the drive shaft 62 to the left to a rest position which will be described in detail hereinafter.

In order to effect reciprocation of the drive shaft 62 so as to effect pivoting of the arm 32 and the transfer of a label from a label stack to the mold half cavity 24, the drive shaft 62 is provided with a depending carrier 88. The carrier 88 includes an upper block 90 which is recessed at its upper end to receive an intermediate portion of the drive shaft 62 and is secured to the drive shaft by way of a pair of bolts 92. With reference to FIG. 3, it will be seen that the plate 36 is provided with an elongated rectangular cross section, through opening 94 of a width slightly greater than that of the block 90 and of a length to permit the block to reciprocate with the drive shaft therein. The block 90 is guided by the opposite side walls of the opening 94 and prevents rotation of the shaft 62.

The support 80 includes a lower block 96 which is secured against the bottom of the block 90 by the bolts 92. The block 96 projects to the left beyond the block 90 and is vertically bifurcated to define a horizontal opening 98. A cam follower 100 is positioned in the opening 98 and in projecting relation from the block 96 by a pivot pin 102.

Figure 4:
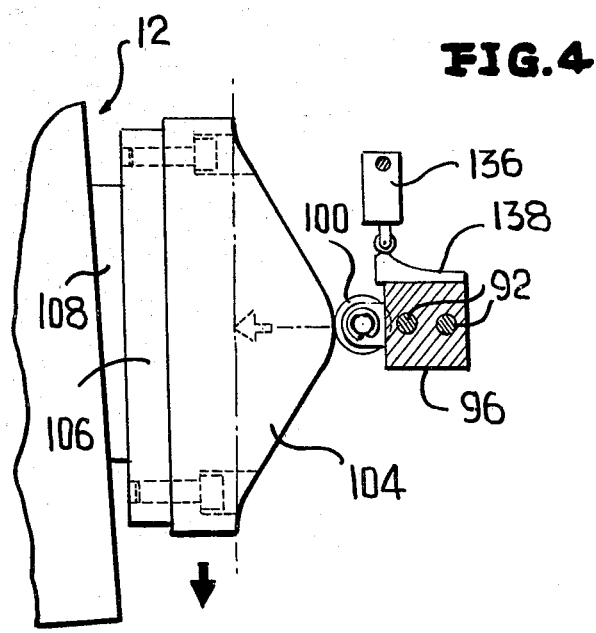
FIG. 4 is a fragmentary horizontal sectional view taken generally along the line 4—4 of FIG. 2, and shows the mounting of an actuating cam carried by the associated mold half.

As is best shown in FIG. 4, the mold half 12 carries a cam 104 for engagement with the cam follower 100. The cam 104 is suitably mounted on the mold half 12 by way of spacer plates 106 and 108.

Referring once again to FIG. 2, it will be seen that the plate 38 carries a suitable hopper 110 for a horizontally disposed stack 112 of labels L. In order that a foremost label L may be removed from the stack 112, the transfer head 40 is provided with two vacuum heads 114 which are generally aligned longitudinally of the cavity 24 and positioned for engaging a central portion of a label L to be applied. Each suction head 114 includes a suction cup 116 carried by a sleeve 118 which is telescoped over a tubular support 120.

The transfer head 40 further includes a vacuum head 122 which is positioned for engaging a peripheral edge of a label. The vacuum head 122 differs from the head 114 in that it includes a suction cup 124 which is carried by bellows 126 which, in turn, is carried by a sleeve 128 telescoped over the respective tubular support 120. When the suction cup 124 is sealed relative to a label, the vacuum within the vacuum head 122 will result in the collapse of the bellows to the position illustrated in FIG. 2 so as to effect a peeling of the foremost label L from the stack 112 as shown in phantom lines in FIG. 2.

At this time it is pointed out that the vacuum head 122 has been improved over prior art devices in that the suction cup 124 is provided with a combination supporting and positioning sleeve 130 which is telescoped over and slidably mounted on the tubular support 120 so as to maintain the proper orientation of the vacuum cup 124 in the extended position of the bellows 126. It has been found in the past that in order to obtain the desired flexibility of the bellows 126, the bellows 126 must be sufficiently thin so as to have a tendency to sag and permit the suction cup 124 to be disposed in tilted relation and out of alignment with respect to the tubular support 120. The sleeve 130 cures the deficiencies of the prior art devices.

Figure 5A:
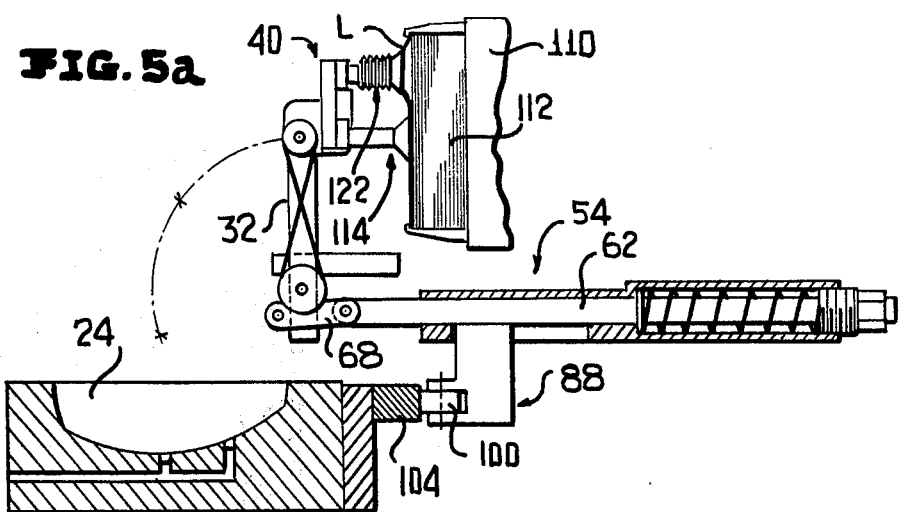
FIG. 5a is a diagrammatic view showing the transfer device having engaged and partially peeled a label from the label stack ready for transfer of the label to a mold half cavity.

As previously described, the at rest position of the transfer head 40 is adjacent the stack 112. The vacuum heads 114 are retained in light engagement with the foremost label of the stack 112 by the action of the compression spring 86. It is to be understood that when the transfer head 40 assumes this position. the foremost label L will be engaged by the vacuum heads 114 and 122 with the bellows 126 being actuated and the label partially peeled from the stack 112 as is best shown in FIG. 5a. In order to obtain this desired adjustment, the member 76 will be adjusted relative to the plate 56 by threading the same in or out as is required.

Figure 5B:
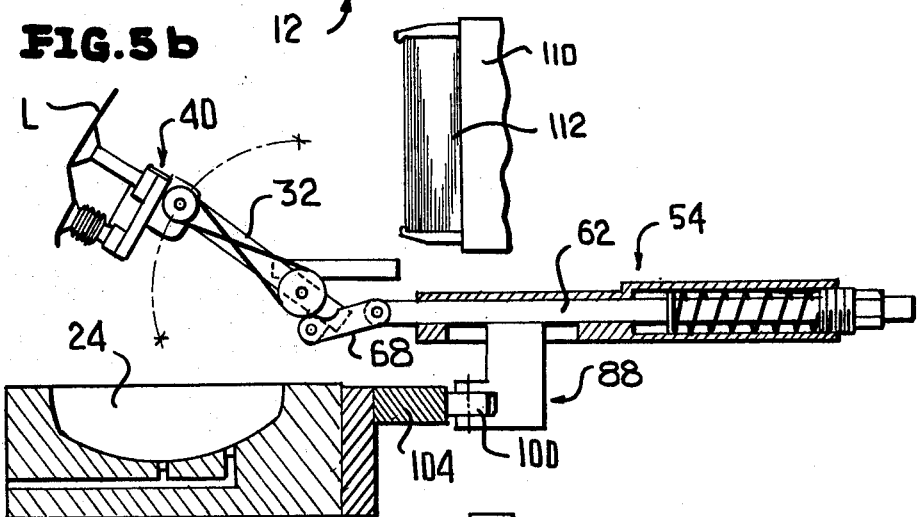
FIG. 5b is a diagrammatic view of the transfer device in an intermediate position.

When the mold half 12 into which the label L is to be placed approaches the transfer device 30, the cam 104 will engage the cam follower 100 and begin moving the drive shaft 62 to the right. Because the pivot pin 70 connecting the links 68 to the arm 32 is carried by an offcenter projection 132, the arm 32 will be pulled down and to the left in a counterclockwise direction relative to the axis of the pivot pin 34. The pivoting of the arm 32 will result in the actuator means pivoting the transfer head 40 about the end of the arm 32 in a counterclockwise direction. This is clear from the showing of the intermediate position of the arm 32 and the transfer head 40 in FIG. 5b.

Figure 5C:
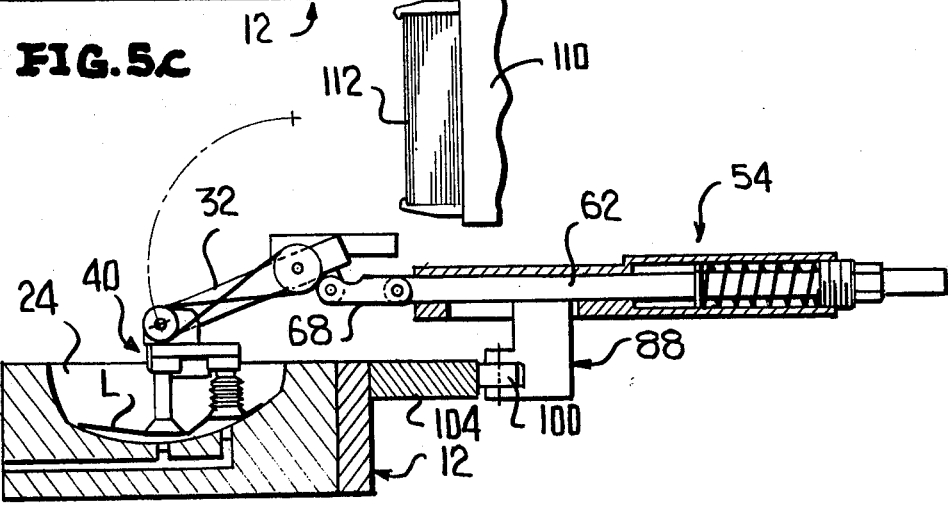
FIG. 5c is a diagrammatic view showing the transfer device in its label applying position.

Referring now to FIG. 5c, it will be seen that the movement of the drive shaft 62 to the right will continue until the cam follower 100 is engaged with the crest of the cam 104 at which time the vacuum heads 114 and 122 will have positioned the label L within the mold cavity 24 with the label being closely spaced from the wall of the mold cavity as is clearly shown in FIG. 2.

It is to be understood that the transfer head 40 will have a flexible line connected thereto in communication with the tubular supports 120. Further, the line, which is identified by the numeral 134, is connected to a suitable control valve (not shown) which may selectively couple the line 134 with a vacuum source or pressure source. Normally the control valve is set to couple the line 134 with the vacuum source so as to hold the label on the transfer head 40. However, when the transfer head 40 reaches the position shown in FIG. 2 relative to the mold half 12, the line 134 is placed in communication with the pressure source so as not only to release the label, but also to blow the label in place on the mold cavity 24.

In order that the actuation of the control valve may be automatic, an actuator 136 for the control valve is positioned adjacent the support 88 for actuation by a cam 138 carried by the support 88. Thus, when the shaft 62 reaches its maximum position of travel, the actuator 136 is actuated to shift the control valve from vacuum to pressure.

Although it is not a part of this invention, with reference to FIGS. 2 and 3, it will be seen that the wall of the cavity 24 in the area where the label L is to be applied is provided with a plurality of bores 140, each carrying a plug 142 having narrow slots 144 therethrough. Each bore 140 opens into a vacuum line 146.

Although the transfer apparatus associated with the outer mold halves 14 has not been illustrated, it is to be understood that a transfer device which is generally the reverse of the transfer device 30 will serve to apply suitable levels to the outer mold half cavities.

It is to be understood that the movement of the transfer head 40 into and out of the cavity 24 is rapidly achieved so that the vacuum head 114 and 122 and the label carried thereby will clear the projection 26 and at the same time the vacuum heads 114 and 122 will move sufficiently fast out of the cavity 24 after the label has been discharged so as to clear the trailing end of the mold half defining the cavity. It is to be understood that the transfer devices 30 operate at such speeds so as in no way to interfere with the normal operation of the molding apparatus 10.

Although only a preferred embodiment of the invention has been specifically illustrated and described herein, it is to be understood that minor changes may be made in the transfer apparatus without departing from the spirit and scope of the invention as defined by the appended claims.

I claim:

1. A transfer device for transferring a label and like sheet from a stack to a moving member, said transfer device comprising an arm mounted for pivoting about a fixed first pivot axis defined by a first pivot shaft for movement between a position adjacent a stack to a position adjacent a moving member and return, a transfer head having transfer means for picking up and discharging labels and like sheets, a second pivot shaft pivotally mounting said transfer head on said arm for movement with said arm and for pivoting relative to said arm about a second pivot axis movable with said arm wherein said transfer head moves from a generally vertical position adjacent a stack to a generally horizontal position adjacent a moving member, and actuator means for effecting pivoting of said transfer head relative to said arm in response to pivoting of said arm; said actuator means including a first pulley fixed to said transfer head and movable about said second pivot axis, a second pulley mounted on said first pivot shaft and fixed against rotation about said first pivot axis, and belt means interconnecting said pulleys.

2. A transfer device according to claim 1 wherein said first pulley is smaller than said second pulley wherein said transfer head pivots relative to said arm at a greater angular rate than the angular rate of pivoting of said arm.

3. A transfer device according to claim 1 wherein said pulleys are of different sizes wherein said transfer head pivots relative to said arm at an angular rate different from the angular rate of pivoting of said arm.

4. A transfer device according to claim 3 wherein said pulleys are of different sizes wherein said transfer head pivots relative to said arm at an angular rate different from the angular rate of pivoting of said arm.

5. A transfer device according to claim 1 together with drive means for effecting pivoting of said arm, said drive means comprising an elongated drive shaft, a support mounting said drive shaft for axial reciprocation along a generally horizontal line, a cam follower carried by said drive shaft for engaging a cam carried by a moving member, and linkage connecting said arm to said drive shaft for pivoting in response to axial movement of said shaft.

6. A transfer device according to claim 5 wherein there is a compression spring acting axially on said drive shaft in resistance to the direction of movement of said drive shaft by said cam follower to normally position said transfer head adjacent a stack.

7. A transfer device according to claim 5 wherein said transfer device is associated with a blow molding machine, said moving member is a mold half having a cavity, and said transfer head is particularly constructed for positioning a label in said cavity in a preselected position.

8. A transfer device according to claim 5 wherein said transfer means includes a plurality of vacuum heads, one of said vacuum heads including a suction cup carried by a bellows wherein when said suction cup is sealed by a sheet a vacuum is drawn in said bellows with the bellows axially collapsing to displace said suction cup, said bellows having a sleeve portion mounted on a tubular support, said one vacuum head being improved by said suction cup being provided with a guide slidably mounted on said tubular support for maintaining the orientation of said suction cup relative to said tubular support.

9. A transfer device according to claim 1 wherein said transfer means includes a plurality of vacuum heads, one of said vacuum heads including a suction cup carried by a bellows wherein when said suction cup is sealed by a sheet a vacuum is drawn in said bellows with the bellows axially collapsing to displace said suction cup, said bellows having a sleeve portion mounted on a tubular support, said one vacuum head being improved by said suction cup being provided with a guide slidably mounted on said tubular support for maintaining the orientation of said suction cup relative to said tubular support.

10. A transfer device for transferring a label and like sheet from a stack to a moving member, said transfer device comprising an arm mounted for pivoting about a fixed first pivot axis defined by a first pivot shaft for movement between a position adjacent a stack to a position adjacent a moving member and return, a transfer head having transfer means for picking up and discharging labels and like sheets, a second pivot shaft pivotally mounting said transfer head on said arm for movement with said arm and for pivoting relative to said arm about a second pivot axis movable with said arm wherein said transfer head moves from a generally vertical position adjacent a stack to a generally horizontal position adjacent a moving member, and actuator means for effecting pivoting of said transfer head relative to said arm in response to pivoting of said arm; and drive means for effecting pivoting of said arm, said drive means comprising an elongated drive shaft, a support mounting said drive shaft for axial reciprocation along a generally horizontal line, a cam follower carried by said drive shaft for engaging a cam carried by a moving member and causing axial movement of said drive shaft, and linkage connecting said arm to said drive shaft for pivoting in response to axial movement of said shaft.

11. A transfer device according to claim 10 wherein there is a compression spring acting axially on said drive shaft in resistance to the direction of movement of said drive shaft by said cam follower to normally position said transfer head adjacent a stack.

12. A transfer device according to claim 10 wherein said cam follower is carried by a support arm projecting from an intermediate portion of said drive shaft, and said support arm being in guided relation with said support for preventing rotation of said shaft in said support.

13. A transfer device according to claim 12 wherein said transfer means includes combined suction and blow off means for first holding a sheet and then discharging the sheet, there is a control device for selectively providing for suction and blow off, and said support arm carries an actuating cam for said control device.

* * * * *